(12) United States Patent
Woolfe et al.

(10) Patent No.: US 8,593,680 B2
(45) Date of Patent: Nov. 26, 2013

(54) NATURAL LANGUAGE COLOR SELECTOR AND NAVIGATOR FOR SELECTING COLORS FROM A COLOR SET

(75) Inventors: Geoffrey J. Woolfe, Canandaigua, NY (US); Robert R. Buckley, Rochester, NY (US); John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1949 days.

(21) Appl. No.: 11/762,155

(22) Filed: Jun. 13, 2007

(65) Prior Publication Data

US 2008/0003547 A1 Jan. 3, 2008

Related U.S. Application Data

(63) Continuation-in-part of application No. 11/479,484, filed on Jun. 30, 2006.

(51) Int. Cl.
*G09B 19/00* (2006.01)

(52) U.S. Cl.
USPC ............... 358/1.9; 358/500; 358/540; 434/98

(58) Field of Classification Search
USPC ......................................... 358/1.9, 500–540
See application file for complete search history.

(56) References Cited

U.S. PATENT DOCUMENTS

| 6,032,004 A | 2/2000 | Mirabella, Jr. et al. |
| 7,043,474 B2 | 5/2006 | Moisilovic et al. |
| 2005/0206925 A1* | 9/2005 | Agehama ..................... 358/1.9 |
| 2006/0087517 A1 | 4/2006 | Mojsilovic |
| 2007/0100786 A1* | 5/2007 | Moroney ......................... 707/1 |

* cited by examiner

*Primary Examiner* — Qian Yang
(74) *Attorney, Agent, or Firm* — Gibb & Riley, LLC

(57) ABSTRACT

Embodiments herein include a method, service, apparatus, etc., that receives initial user input comprising natural language commands that identify the initial color selection. The method displays the initial color samples or patches corresponding to the initial color selection in a two-dimensional grid and receives additional user input comprising additional natural language commands and a refined axis selection. The embodiments herein revise the initial color selection to a revised color selection based on a color change magnitude, a color change direction, and a color change property. Then, this method matches the revised color selection to the computer program colors to produce refined matching colors. These refined matching colors are displayed as refined color samples or patches in the two-dimensional grid. The axes of the two-dimensional grid can correspond to the refined axis selection and the assigned names can also be displayed on the graphic user interface.

14 Claims, 8 Drawing Sheets

NATURAL LANGUAGE COLOR SELECTOR AND NAVIGATOR FOR SELECTING COLORS FROM A COLOR SET

CROSS-REFERENCE TO RELATED APPLICATIONS

This application is a Continuation-In-Part (CIP) of U.S. patent application Ser. No. 11/479,484, filed on Jun. 30, 2006 by Geoffrey J. Woolfe, having Attorney Docket Number 20051444-US-NP, which is fully incorporated herein by reference.

BACKGROUND AND SUMMARY

Embodiments herein generally relate to systems that provide an interface to users to allow the users to locate and select colors of items and more particularly to systems and methods that allow users to input natural language commands to perform color selection.

Color sets or collections are in widespread use in a range of commercial and consumer industries. Color sets or collections may be the names of actual colored objects in the collection, as is the case for a box of crayons or a collection of house paints, or they may be simply a collection of names associated with defined color specifications, as is the case for Pantone and other color collections used in the graphic design industry. In the case of Pantone and similar color collections, the collection can be implemented either in software or as books of colored sample swatches. The software implementation is essentially a file that relates Pantone names to color specifications. In most cases the colors in the collection are assigned names that may be more or less descriptive of the appearance of the color. One commercially available color selection system, Pantone (available from Pantone, Inc. Carlstadt, N.J., USA) names its colors using names like Pantone 172 CVC, which is a vivid orange color. Clearly finding the correct Pantone color name to match an intended color can be difficult.

Pantone attempts to assist users by producing swatch books in which the patches are grouped into similar colors and arranged in something like a spectral progression. Vendors such as X-Rite (Grand Rapids, Mich., USA) offer a tool which returns the closest Pantone color to a given color on the screen. Similar problems arise with paint colors or crayon colors where the names used often convey little or no information about the appearance of the color. Paint manufacturers try to address this problem by arrangement of colors on a color card according to a color order scheme.

Natural language presents a number of unique opportunities for assisting this named color selection problem. These opportunities are the subject of the embodiments of this disclosure. More specifically, the embodiments herein comprise a color selector that allows users to find colors from a collection or set of available colors by providing a natural language description of the color appearance desired. This is particularly useful in situations where the colors in the collection have names that convey little or no information concerning the appearance of the color.

In a simple embodiment, the user enters a verbal description of the desired color appearance and the application returns a set of color patches, displayed on the monitor, together with the names of the colors. A user then uses language commands to adjust the color and range of colors selected. In addition to natural language commands entered through a microphone or keyboard, the embodiments herein also allow the use of a pointing device and other user interface designs in combination with the natural language interface.

Thus, one method embodiment herein starts by receiving initial user input. This initial user input can comprise initial natural language commands that identify an initial color selection. The method displays a plurality of initial color samples or patches that correspond to the initial color selection in a two- or three-dimensional grid (e.g., using a pseudo 3D plot—using perspective to give the illusion of 3D) on a graphic user interface, such as a computer monitor. The axes of the two-dimensional grid can correspond to a predetermined standard axis system. Also, simultaneously displayed on the graphic user interface are assigned names of the initial color regions, and these names are positioned adjacent (above, below, beside, in, on, etc.) the initial color regions. This displays the names of the colors as they are defined in the collection being searched. If it is a Pantone collection then Pantone's names are displayed. If it was a collection of Crayon colors then it would be Crayon's names that are displayed. However, many times the initial natural language commands are different than assigned names (e.g., Pantone names) of the initial color regions because color names assignments are often made based on criteria that are fundamentally different than names commonly given by casual users e.g. for marketing purposes.

After displaying the initial color regions, the method may (or may not) receive at least one additional user input. Such additional user inputs can comprise additional natural language commands and/or a revised axis selection. These additional natural language commands can comprise a color change magnitude, a color change direction, and a color change property.

For example, a natural language command of "slightly more blue" spoken or typed into a graphic user interface provides the color change magnitude ("slightly"), color change direction ("more"), and color change property ("blue") used by embodiments herein to revise the colors displayed to the user.

Thus, the method revises the initial color selection to a revised color selection based on the color change magnitude, the color change direction, and the color change property provided in natural language format by the user. Then, the method can display revised color regions (patches) that correspond to the revised color selection in the two- or three dimensional grid of the display. However, the axes of the two-or three dimensional grids can also be modified to correspond to the revised axis selection provided by the user in the additional input. The selection of the axes will affect the spatial relationships of the colors to each other as they are displayed on the user interface. For example, if the axes are chosen to be lightness on the vertical axis and hue on the horizontal axis then color samples or patches will be arranged vertically in order of their lightness and horizontally in order of their hue.

In a similar manner to the display of the initial color regions, the display can also simultaneously display the assigned names of the revised color samples adjacent (above, below, beside, in, on, etc.) the revised color samples. The system may be configured such that the names are not displayed unless a pointing device is placed over the color or clicked on the color in order to avoid the display becoming too cluttered. Again, the additional natural language commands may be different than assigned names of the revised color samples. Indeed, the additional language commands comprise color change magnitudes, color change directions, and color change properties and do not necessarily correspond to the names a specific computer program may assign to colors.

The color change property comprises an indication of color, luminance, saturation, etc. The color change magnitude comprises an indication of how much of the color change property should be applied to the initial color selection. The color change direction comprises an indication of whether the color change property should be increased or decreased in the initial color selection.

The initial natural language commands comprise words maintained within at least one previously established library of natural language color names. Similarly, the additional natural language commands comprises a plurality of words maintained within at least one previously established library of natural language color modifiers (which can be the same library or different pre-established libraries).

When displaying the initial color samples and the revised color samples, the method displays a principal color patch (corresponding respectively to the best matching sample to either the initial color selection or the revised color selection) and displays secondary color samples having similarities to the principal color patch. Ones of the secondary color samples that are more similar to the principal color patch are positioned closer to the principal color patch, and ones of the secondary color samples that are less similar to the principal color patch are positioned further from the principal color patch. The concept of similarity depends on the axes and measurement system you are using. In Figure one, the invention has defined axes to be lightness and colorfulness. Thus, similarity is measured in these terms. If one changed the axes properties to be, say, hue and saturation, then the similarity relationships might well change.

Another method embodiment similarly begins by receiving initial user input comprising such natural language commands that identify the initial color selection. However, this embodiment then performs a step of matching the initial color selection to computer program colors used by an associated computer program to produce initial matching colors. Therefore, this embodiment is useful as an intermediary program that provides a service of interfacing between the user and the associated computer program that requires color selection.

This method similarly displays the initial color regions corresponding to the initial color selection in a two-dimensional grid and receives additional user input comprising additional natural language commands and a revised axis selection. This embodiment also revises the initial color selection to a revised color selection based on the color change magnitude, the color change direction, and the color change property. Then this method matches the revised color selection to the computer program colors to produce revised matching colors. These refined revised matching colors are displayed as revised color regions in the two-dimensional grid. Again, the axes of the two-dimensional grid can correspond to the revised axis selection and the assigned names can also be displayed on the graphic user interface.

Further, this embodiment can receive a selection of one or more of the revised color samples as one or more selected colors from the user. The selected color(s) are then provided to the associated computer program.

When matching of the initial user input to the computer program colors, this embodiment ignores the assigned names of the colors. To the contrary, rather than trying to match the natural language commands to arcane or irrelevant names given to the colors by the associated computer program, the embodiments herein match colorimetric or color appearance characteristic of the initial color selection and the revised color selection to the colorimetric or color appearance characteristics of the computer program colors (in a colorspace) to determine which of the computer program color patches to display to the user.

In other words, the embodiments herein use the pre-established libraries to identify the color (in terms of colorspace, colorimetric, or spectral characteristics) that is being requested by the user through the user's natural language commands. Then, the embodiments match these colorimetric or spectral characteristics (or colorspace) to the most similar color available in the associated computer program with which the embodiments herein are operating, without relying upon the names assigned to the available colors by the associated computer program. Thus, the embodiments herein convert the user's words to a color and then match that color to the associated computer program color, without performing any name matching. Then, when the embodiments herein display the available colors, the user is provided with the names of those colors as defined by the associated computer program. By operating in this manner, the user does not need to know the names of the colors that the associated computer program has assigned to colors, but instead the user can rely upon casual (generic) natural language names and commands to locate their desired color.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
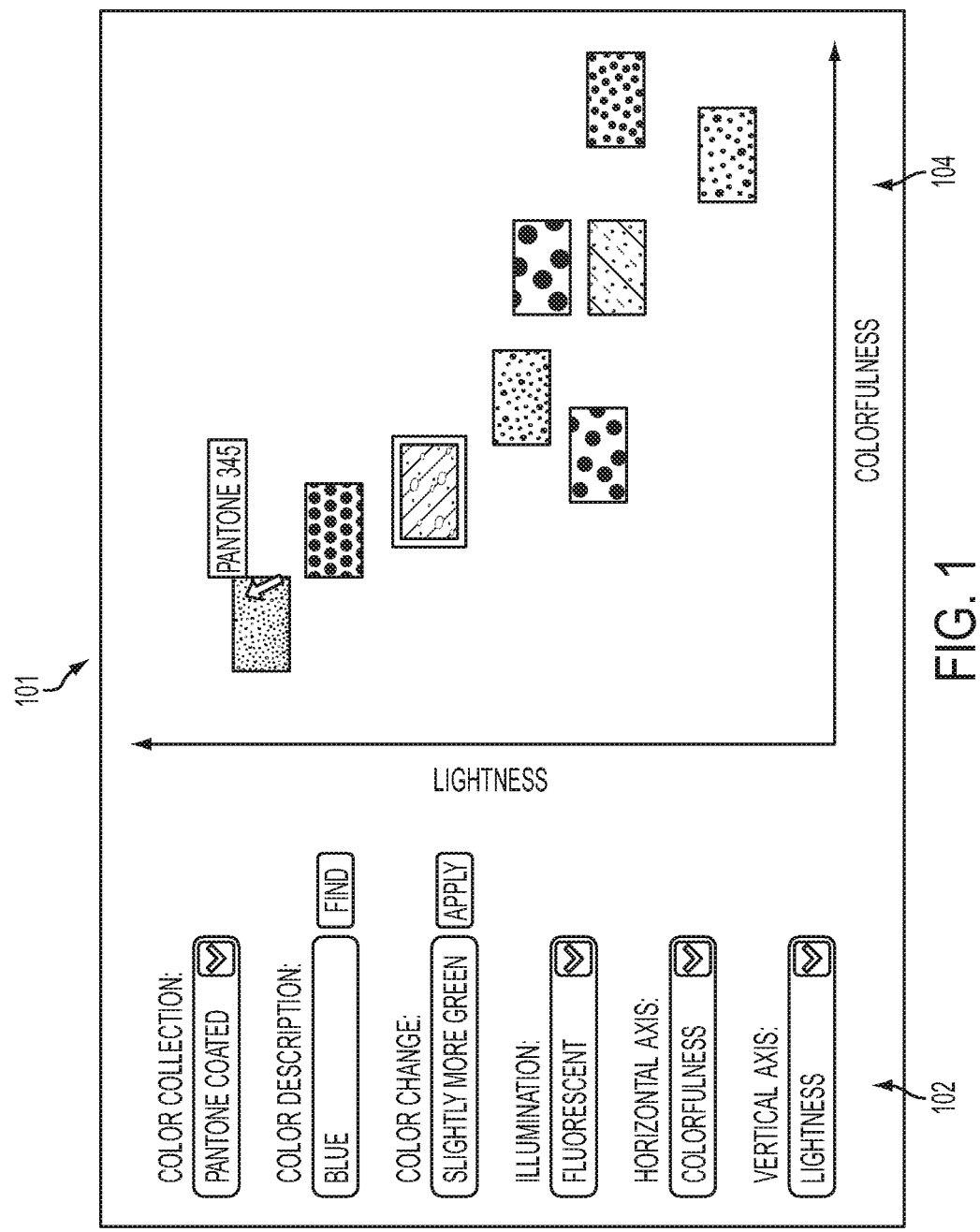
FIG. 1 is a schematic representation of a user interface screen according to embodiments herein.

The embodiments herein provide processes, systems, services, computer programs, etc. to allow users to select colors using natural language commands. More specifically, the embodiments herein provide a color selector that allows users to find colors from a collection or set of available colors by providing a natural language description of the color appearance desired. This is particularly useful in situations where the colors in the collection have names that convey little or no information concerning the appearance of the color.

In a simple embodiment, the user enters a natural language description (verbal or typed) of the desired color appearance and the embodiments herein return a set of color patches, displayed on a monitor (printed, etc.), together with the names of the colors. For example, if the user specified blue as a natural language command, then a selection of patches would be displayed whose appearance would generally be described as 'blue' according to a previously established library. The selection could be restricted by using a more precise natural language description such as 'dark blue'.

A user then uses natural language commands to adjust the range of colors selected. For example, the user can specify 'more purple' and the selection range would be adjusted to include colors that are 'more purple' than the current selection. This process can continue repeatedly (through numerous iterations) until the desired color is located. In addition to the natural language inputs, the embodiments herein also allow the use of a pointing device and other user interface designs in combination with the natural language interface.

Color sets or collections typically comprise colors identified with names. Unfortunately, in many cases the names convey little or no information about the appearance of the color. This is true for colors of paints and other consumer goods, and for nominal color systems such as Pantone. For example, the color selector used in Adobe Photoshop (available from Adobe Corporation, San Jose, Calif., USA) for Pantone colors assists users in finding a particular Pantone color. Adobe has provided a color slider to provide an indication of the color as a function of position in the list of Pantone colors. Unfortunately, this slider is not organized according to any single color property such as hue, lightness, colorfulness etc. For example, yellow colors appear at five or six different locations on the slider.

Thus, the embodiments herein address the problem of finding colors based on their color appearance by allowing users to provide a natural language (verbal or typed) description of the color. Colors matching the verbal description are returned in a form that allows the user to either select the color the user wants, revise the selection further with a new verbal selection, or shift the characteristics of the selection by issuing natural language color change commands such as 'slightly lighter', 'more colorful' etc.

The color set or collection that is available will typically include a number of colors with names and associated calorimetric, colorspace or spectral (reflectance/transmittance) characteristics. The calorimetric, colorspace or spectral characteristics are used by embodiments herein, but the specific names of the colors are not critical to the embodiments herein. Names are however useful as a means to identify and distinguish between the colors available in the collection. In many cases the colors will represent a range of available colors for a product. Examples might include paint or ink colors, fabric colors, paper colors, clothing colors or the colors of household items. The embodiments herein are useful in situations where there is a large collection of available colors and the names of the colors do not convey a clear description of the color appearance.

One example of the user interface used with embodiments herein is shown in FIG. 1. This exemplary user interface is a very simple example, and those ordinarily skilled in the art would understand that many forms of the interface and many different interfaces could be used with embodiments herein. For example, while FIG. 1 illustrates a two-dimensional grid, those ordinarily skilled in the art would understand that a three-dimensional grid (or other formats) could be utilized to display the colors. In addition, while color patches are mentioned below, one ordinarily skilled in the art would understand that many different forms of presentation could be used to display the different colors including color wheels, color spectrums, etc. Therefore, the graphic user interface presented in FIG. 1 is intended only as an example to illustrate one way in which the embodiments herein could operate.

The example display 101 shown in FIG. 1 includes two panels—a panel on the left 102 where the user can input his/her specifications and a panel on the right 104 where the colors in the collection that meet the users specifications can be displayed and arranged. As shown in FIG. 1, the user can enter a color collection and a verbal or typed natural language color description (blue) on the left side 102 of the control panel. Alternatively, such information can be entered through pull-down or pop-up menus.

One or more colors in the color collection that satisfy the natural language color description are then found and displayed on the right hand panel 104. If the color collection has associated spectral data for each color in the collection then it is also possible to compute the color coordinates of the color under different illuminants. It may be that some color collections assume an illuminant.

This interface 101 provides other additional benefits to users. Firstly, one can verbally specify a change in the selection. In FIG. 1, this is illustrated by the menu selection of "slightly more green". "Verbally" allows for the possibility of a speech interface, where the natural language instruction is spoken rather than typed. Alternatively, the same words can be typed or selected using a pointing device from a pull-down or pop-up menu. This color change moves the entire selection region 104 in a slightly more green direction and the color collection would then be re-evaluated against this new selection region.

Another advantage of this interface 101 is that the selected colors may be arranged or displayed in many different, user selectable ways (by, for example, changing the horizontal or vertical axis in area 102). In the example shown in FIG. 1, the colors are arranged horizontally according to colorfulness and vertically according to lightness. These attributes are user selectable and a user might instead choose to arrange the blue colors according to their "saturation" along one axis and "purple-ness" along the other. This flexible arrangement of colors allows the user to arrange the colors along axes that are important to him rather than the standard axes dictated by common color spaces.

The colors may also be arranged in a pre-determined way by the computer application. For example, the color closest to the prototypical coordinates of the color description would be in the center of the arrangement, with the others selected colors distributed around it at distances corresponding to the difference between them and the color at the center. Color descriptions are fuzzy descriptions and do not have exact coordinates. The term prototypical coordinates means the coordinates of the color that is the best example of the verbal color description.

User interfaces according to embodiments herein can have components for identifying the color collection, the color description and the color change (area 102). Even so, the color collection may be explicit, such as in a tool specifically designed to find and navigate through Pantone colors for example.

Figure 2:
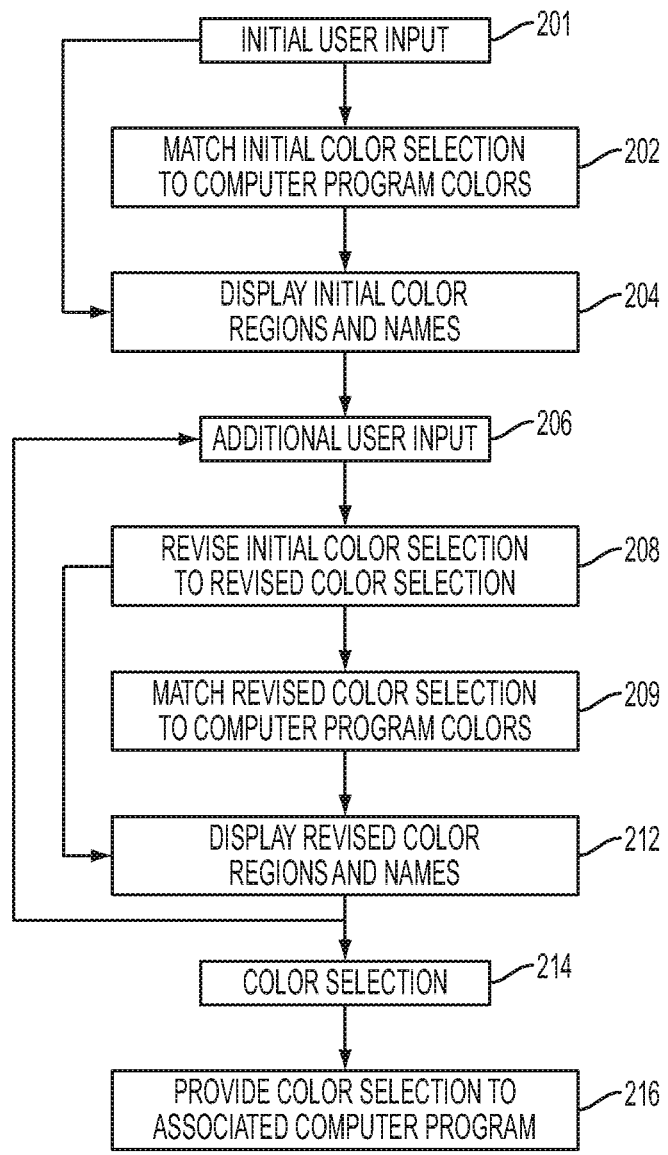
FIG. 2 is a flow diagram illustrating an embodiment herein.
Figure 3:
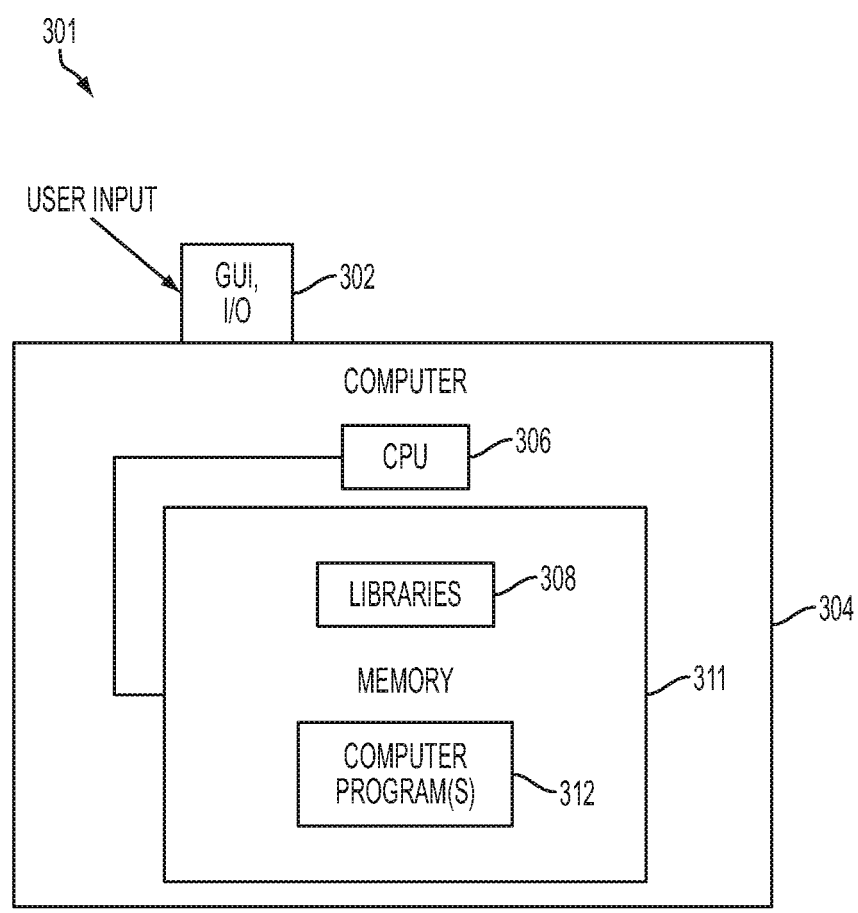
FIG. 3 is a schematic representation of a system according to embodiments herein.

Referring now to FIGS. 2 and 3, one method embodiment herein starts by receiving initial user input in item 201 through any form of graphic user interface 302 of a computer or computerized device 301. The device 301 can comprise any device capable of executing a set of logical instructions and can comprise, for example, a computer, a personal digital assistant (PDA), digital camera, cell phone, printer, copier, etc. (represented at item 304). Such devices commonly include a graphic user interface 302, which can comprise (but is not limited to) a keyboard, microphone, pointing device, display, speakers, audio/visual inputs and outputs, network connections, etc.

The word printer, copier, etc., as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA and Hewlett Packard Company, Palo Alto Calif., USA. Such printers commonly include input/outputs 302, power supplies, processors 306, media movement devices, marking devices etc., the details of which are omitted herefrom to allow the reader to focus on the salient aspects of the embodiments described herein.

Computers 304 that include input/output devices 302, memories 311, processors 306, etc. are readily available devices produced by manufactures such as International Business Machines Corporation, Armonk N.Y., USA and Apple Computer Co., Cupertino Calif., USA. Such computers 304 commonly include input/output devices 302, power supplies, processors 306, electronic storage memories 311, wiring, etc., the details of which are omitted herefrom to allow the reader to focus on the salient aspects of the embodiments described herein.

This initial user input 201 can comprise initial natural language commands that identify an initial color selection. The method displays a plurality of initial color regions or patches that correspond to the initial color selection in a two-dimensional grid on a graphic user interface 302, such as a computer monitor in item 204.

As shown in the example in FIG. 1, the axes of the two-dimensional grid correspond to a predetermined standard axis. Also, simultaneously displayed on the graphic user interface 302 are assigned names of the initial color samples or patches, and these names are positioned adjacent (above, below, beside, in, on, etc.) the initial color samples or patches. However, many times the initial natural language commands are different than assigned names of the initial color samples or patches because color names are often assigned based on criteria that are fundamentally different than names commonly given by casual users.

After displaying the initial color regions, the method can receive at least one additional user input in item 206. Such additional user inputs 206 can comprise additional natural language commands and/or a revised axis selection. These additional natural language commands may comprise a color change magnitude, a color change direction, and a color change property. In some cases the command may contain implicit information. e.g., the command 'darker' may be parsed to mean 'moderately more dark'. For example, a natural language command of "slightly more blue" spoken or typed into a graphic user interface 302 provides the color change magnitude ("slightly"), color change direction ("more"), and color change property ("blue") used by embodiments herein to revise the colors displayed to the user.

Thus, the method revises the initial color selection to a revised color selection based on the color change magnitude, the color change direction, and the color change property provided in natural language format by the user in item 208. Then, the method can display revised color samples (patches) that correspond to the refined revised color selection in the two-dimensional grid of the display in item 212. However, the axes of the two-dimensional grid can also be modified to correspond to the revised axis selection provided by the user in the additional input. The process loops back to obtain additional user inputs in item 206 in an iterative, repeating process that continues until the user finds the color that they were seeking.

In a similar manner to the display of the initial color regions, the display can also simultaneously display the assigned names of the revised color samples or patches adjacent (above, below, beside, in, on, etc.) the revised color regions. The system may be configured such that the names are not displayed unless a pointing device is placed over the color or clicked on the color in order to avoid the display becoming too cluttered. Again, the additional natural language commands may be different than assigned names of the revised color samples or patches. Indeed, the additional language commands comprise color change magnitudes, color change directions, and color change properties that do not necessarily correspond to the names a specific computer program 312 may assign to colors.

The aforementioned "color change property" comprises an indication of color, luminance, saturation, hue etc. The "color change magnitude" comprises an indication of how much of the color change property should be applied to the initial color selection. The "color change direction" comprises an indication of whether the color change property should be increased or decreased in the initial color selection.

The initial natural language commands comprise words maintained within at least one previously established library of natural language color names. Similarly, the additional natural language commands comprises a plurality of words maintained within at least one previously established library of natural language color modifiers (which can be the same or a different pre-established library).

As shown in FIG. 1, when displaying the initial color samples or patches and the revised color samples or patches, the method displays a principal color patch (corresponding respectively to either the initial color selection or the revised color selection) and displays secondary color samples or patches having similarities to the principal color patch. Ones of the secondary color samples or patches that are more similar to the principal color patch are positioned closer to the principal color patch and ones of the secondary color samples or patches that are less similar to the principal color patch are positioned further from the principal color patch. The concept of similarity depends on the measurement system you are using. In Figure one, the invention has defined axes to be lightness and colorfulness. Thus, similarity is measured in these terms. If one changed the axes properties to be, say, hue and saturation then the similarity relationships might well change.

Another method embodiment similarly begins by receiving initial user input 201 comprising such natural language commands that identify the initial color selection. However, this embodiment then performs a step of matching the initial color selection to computer program colors in item 202 used by an associated computer program 312 to produce initial matching colors. Therefore, this embodiment is useful as an intermediary program (tool) that provides a service of interfacing between the user and the associated computer program 312 that requires color selection.

This method similarly displays the initial color regions corresponding to the initial color selection in a two-dimensional grid 204 and receives additional user input comprising additional natural language commands and a revised axis selection in item 206. This embodiment also revises the initial color selection to a revised color selection based on the color change magnitude, the color change direction, and the color change property in item 208. Then this method matches the revised color selection to the computer program colors to produce revised matching colors in item 209. These revised matching colors are displayed as revised color samples or patches in the two-dimensional grid in item 212. Again, the axes of the two-dimensional grid can correspond to the revised axis selection and the assigned names can also be displayed on the graphic user interface 302.

Further, this embodiment can receive a selection of one or more of the revised color samples or patches as one or more selected colors from the user through the graphic user interface 302 in item 214. The selected color(s) are then provided to the associated computer program 312 in item 216.

When matching the initial user input to the computer program colors in item 202 and similarly matching the additional user input in item 209, this embodiment ignores the assigned names of the colors. To the contrary, rather than trying to match the natural language commands to arcane or irrelevant names given to the colors by the associated computer program 312, the embodiments herein match colorimetric, colorspace or spectral color characteristic of the initial color selection and the revised color selection to the colorimetric, colorspace or spectral color characteristics of the computer program color in a colorspace to determine which color patches to display to the user.

In other words, the embodiments herein use the pre-established libraries to identify the color (in terms of colorspace, colorimetric, or spectral characteristics) that is being requested by the user through the user's natural language commands. Then, the embodiments match these colorimetric or spectral characteristics (or colorspace) to the most similar color available in the associated computer program with which the embodiments herein are operating, without relying upon the names assigned to the available colors by the associated computer program. Thus, the embodiments herein convert the user's words to a color and then match that color to the associated computer program color, without performing any name matching. Then, when the embodiments herein display the available colors, the user is provided with the names of those colors as defined by the associated computer program. By operating in this manner, the user does not need to know the names of the colors that the associated computer program has selected, but instead the user can rely upon casual (generic) natural language names and commands to locate their desired color.

Incorporation of U.S. patent application Ser. No. 11/479,484

The embodiments disclosed in U.S. patent application Ser. No. 11/479,484 relate to a color control system, and more specifically, a user-friendly color control system for imaging novices.

U.S. patent application Ser. No. 11/479,484 discloses that there are many ways to specify color and color difference. Color imaging scientists and engineers use precise, numeric color specifications based on standardized color spaces and color encodings. Such color specifications are often based on the color matching behavior of a standard human observer. Color matching behavior has been embodied in the CIEXYZ system of colorimetry, for example. Other related systems based on the color matching behavior of a standard human observer include the widely used CIELab or the less common CIELuv system. These color specifications are commonly called device-independent color encodings. Color imaging scientists and engineers also use device-dependent color specifications in which colors can be precisely specified in terms of the color characteristics of a particular device. These color characteristics include the white point and color primaries (or colorants) of the device. Colors are also specified using color order systems such as the Munsell Book of Color, the Swedish Natural Color System, or the Pantone Color Formula Guide. These systems of color specifications are also precise, but are more commonly used by professionals in the color graphics and design industries rather than color imaging.

Another ubiquitous form of specifying color is to use color names in natural language. Although natural language is a far less precise method of color specification than those discussed above, it is nonetheless the most widely used and best understood method of color specification used by consumers of color. This method of color specification uses common color names, such as red, green, blue, etc. It also uses combinations of common color names to refine the specification. Examples of such combinations include reddish-brown, greenish-blue, yellowish-green etc. In addition, natural language provides many modifying adjectives to provide further subtle discrimination in color specification. Examples of such modifying adjectives include light, dark, bright, saturated, vivid, muddy, moderate, dull, pale, washed-out etc.

Natural color languages use other words and phrases for specifying colors and color differences, which may not be as precisely defined as other color specification methods. Examples of these words and phrases include "slightly less yellow", "much darker", "more saturated", "greener", "significantly punchier", and "a smidge lighter". Now, while these expressions are certainly imprecise, many people commonly use them to describe how they would like their printed material to be changed to meet their requirements. However, color management systems that allow a user to modify an input color or set of input colors generally do not use natural language inputs and require the user to develop an understanding of the behavior of the various controls provided in the user interface of such systems. Such systems are therefore difficult to use for many people.

Color management systems allow users to control or adjust color in image or document processing applications where images are modified to increase their pleasantness or to meet the preferences of a user. For example, a user may want to adjust the background color of a picture, or the flesh tones in a digital image prior to printing. Device controls also use color control systems to modify the color reproduction characteristics of a device. Generally, color printing and image processing applications include a user interface that allows the user to communicate color requirements or instructions. However, virtually all color image processing and device control applications have been developed by color imaging scientists and engineers, using quantitative, numerical systems of color specification rather than language-based color specification.

General, non-specialist consumers of image processing and device control applications often have difficulty navigating the user interface of such applications. Many consumers/users, who have little or no understanding of color encodings, describe color using natural language phrases. The scientists and engineers that develop these applications describe color using highly precise color encodings. Most image processing applications, device control interfaces, color pickers etc allow users to specify color and color change only in terms of a numerical, quantitative color space. The control tools are often in the form of sliders or dialog boxes or graphically displayed functions (e.g., curves in Photoshop) that a user can manipulate. These control tools can be difficult to use even for seasoned professionals and it can take many adjustments to achieve an intended modification. In the case of color-naive users, the situation is extremely difficult and often leads to frustration and disappointment. Most users are not trained in the numerical, quantitative color spaces, such as RGB, CIELab, or HSV used in most applications. Therefore, most consumers of color images and documents cannot successfully adjust the colors in these images or documents. It then becomes the job of the graphics professional or printer to translate the spoken or written color requirements of the general public into numerical settings in image editing or device control applications. Many color professionals require extensive training and experience in order to successfully and efficiently manipulate controls in such interfaces to achieve an aesthetic effect that can be stated simply and concisely in verbal terms. It would be desirable to provide a natural language interface for color adjustment and image processing applications to address this color communication gap.

(i.e., their preference). This color communication and system interface may help bridge this gulf between a color-naive public and color control systems by providing a mapping between the natural language descriptions of color and color difference used by color-naive consumers to the numerical color space values used in image processing algorithms and device control transforms. Examination of such instructions indicates that there are two types of color specification in each phrase. The first type of color specification indicates the target range of colors that a user wants to adjust. The target range of colors corresponds to a region or subvolume of the entire color space. The second type of color specification indicates the color modification to be implemented. Table 1 illustrates these two types of color specification, using several example color transform instructions.

TABLE 1

| Natural language Color Specification Phrase | Target Color Range | Color Modification to be Implemented |
|---|---|---|
| Make the greens moderately lighter | Green colors | Moderately lighter |
| Make the blues slightly less purple | Blue colors | Slightly less purple |
| Make the red and purple regions much less contrasty | Red and purple colors | Much less contrast |
| Make the yellows but not greenish-yellows a little more orange | the yellows but not greenish-yellows | a little more orange |

A natural language interface would be a significant advantage to most users of image processing applications and users of color imaging devices. Implementing a natural color interface in such applications would significantly bridge the communication gap that exists between consumers of color management products and color professionals. The natural language method of color specification although lacking the precision of color encodings or color order systems, is still capable of specifying a wide range of colors with reasonable precision. Furthermore, since both color professionals and consumers of color use understand the natural language of color, it is a natural choice as a simple-to-use method of color communication or a color user-interface for technical applications such as image/document creation and editing programs and color device control software. While, verbal description of color and color difference is less precise than the numerical specification of color spaces, one can nonetheless argue that a less precise, but better understood communication system is still preferable to a highly precise but unintelligible interface.

Developing a mapping between natural language color specifications and the precise numerical color encodings used in color image processing and device control applications is not a simple problem. A number of issues complicate this problem. First, there is no uniquely defined natural color language. The words and grammar used to describe color can vary based on culture, geographical location, professional affiliation, and individual preference. Second, the boundaries between named colors are not precisely defined - indeed, they are somewhat fuzzy and can vary, to some extent, between individuals. Third, the lower level of precision afforded by a natural language interface may be perfectly adequate in some applications but be unsuitable for others.

The color communication and system interface as described in embodiments herein may help bridge the communication gap between color-savvy professionals and technicians who develop image processing and device control applications, or perform image editing operations, and the color-naive consumers of color documents who are trying to specify how they want their images or documents to appear What is proposed is a natural language color communication system and interface to color processing applications. It allows users to specify verbally, using natural language terms, regions of color space to which to apply a particular transform. The transform to be applied is also verbally specified using natural language. Examples of verbal color specification and processing transform instructions might include, for example, "make the greens moderately lighter" or "make the blues slightly less purple" or "make the red regions much less contrasty".

Embodiments of the present invention include a natural language color control system. The system includes one or more color term dictionaries of ordinary language color names or descriptions, a working color space, wherein every point in the working color space can be mapped to at least one term in a color term dictionary, and an ordinary language command lexicon and syntax for use with the ordinary language color terms that correspond to transformations in the working color space.

Embodiments of the present invention also include a method for adjusting the color of an image. The method includes generating an electronic image, mapping the image to a working color space, and entering an ordinary language command to adjust the color of at least a portion of the image, the command corresponding to a transformation in the working color space, wherein the color of the image is adjusted in response to the entered command.

Embodiments of the present invention also include a natural language color control method that includes selecting a subject for color adjustment and entering an ordinary language command to adjust a portion of the subject having a particular verbally defined color, the command corresponding to a transformation in the color space. The portion of the subject is adjusted in response to the entered command.

A printing device as used herein refers to any device that produces visible marks on paper. Printing devices include, for example, copiers, printers, or multi-function devices. Paper as used herein refers to any markable media such as, for example, paper, plastic, and textile materials.

A document as referred to herein includes one or more pages of electronic data that can be printed or viewed on a display screen. A document can include, for example, images and/or text.

The embodiments disclosed herein include a natural language color communication system and interface that helps non-experts to communicate color information, intents, and instructions in a reasonably accurate and unambiguous fashion. One aspect of the systems and methods disclosed herein are mathematical models that map natural language color names and color intents to specific colorimetric or color appearance coordinates. The embodiments of the invention disclosed herein can be used in a range of applications from document creation through proofing and pre-press activities to device control.

In addition to reducing the frustration and disappointment levels of consumers of color management systems, a natural language color interface can reduce the number of iterations required in the proofing cycle or the document editing and approval process. It can also make color tools more accessible to color-naive consumers.

Image or document processing applications where users may modify images to increase their pleasantness or to meet the preference of the user could use a natural language color management system. Such applications would include one or more transforms that are applied directly to pixels of an image. Another common application for a natural language color management system is in device control. For example, the natural language interface would allow users to modify the color reproduction characteristics of a device by applying a color correction transform to its color management profile. Examples of verbal specifications in such an application might include "increase contrast slightly", "print reds a little more orange and lighter," or "make the light greens moderately more blue".

To create a natural language color control system, one or more dictionaries of ordinary language color terms should be selected or generated. There is no restriction placed on the lexicon of a color name dictionary, other than that it be suitable for the intended user. While the concept of creating a color name dictionary might seem daunting, there have already been a number of successful dictionaries created. Furthermore, there is widespread commonality in the language used to describe color. Indeed, numerous studies have shown that in English and in most European languages there are only 11 basic color names (black, white, red, green, yellow, blue, brown, pink, orange, purple, and gray). Although the boundaries between these fundamental color names are somewhat fuzzy, there is widespread agreement between observers when asked to name color patches. These 11 fundamental color names are also commonly combined into compound names to allow for finer discrimination and precision in color naming. Examples of such combinations include yellowish-green, green-blue, brownish-red, reddish-purple etc. Note that there are also instances where such combinations are replaced by a new, single-word color name. For example, someone might call green-blue—cyan or turquoise, greenish-brown—olive, reddish-orange—ochre, and greenish-yellow—chartreuse. In addition, there are a number of modifiers that are commonly used in conjunction with the fundamental or compound color names. These modifiers include words such as, for example, light, dark, pale, deep, saturated, medium, dull, pastel, and so on. The color names, compound names, and modified names constitute the terms in one or more color dictionaries.

Color name dictionaries are not new. The National Bureau of Standards in collaboration with the Inter-Society Color Council has already created a standardized color name dictionary. This is called the NBS-ISCC Dictionary of Color Names. It consists of 267 colors specifications with associated names. The names consist of modifiers and either fundamental or compound color names. A number of earlier studies have also developed color naming vocabularies.

To be useful, the terms in a color dictionary should correspond to regions of color space such that every region of color space corresponds to a color term. In embodiments, there may be a direct mapping between finite regions (or subvolumes) of the color space and the color terms in the dictionary. Alternatively, the terms could map to prototypical point locations in the color space (e.g., points in the color space may correspond to pure or ideal shades of cyan and magenta, or navy blue and fire engine red.)

If a color name dictionary is provided as a set of color names with associated prototypical locations in a color space then a means to partition the color space into regions assigned to the various names of the color name dictionary is required. A variety of methods may be used to create these regions. The only requirement is that every location in the color space be assigned to at least one region. The regions may be disjoint or overlapping. There is no restriction on the topological genus of a region and a region may consist of multiple, non-connected sub-regions. One example of a means to partition the color space is to compute the Voronoi partition of the set of prototypical locations in the color space. This approach computes a convex Voronoi cell around each prototypical color space location such that all colors inside the cell are closer to the prototypical location than to any other prototypical location.

Other means of assigning regions of color space to the terms in a color dictionary include using a statistical analysis of the results of psychophysical color naming studies. This method would work to directly map color terms with regions of color space or could be used to define the regions around prototypical locations in color space.

The working color space in which the prototypical locations of named colors are defined can, in theory, be any quantitative color space. However some color spaces are better suited as working spaces than others. Color spaces that are more perceptually uniform are better suited to the application but perceptually non-uniform spaces could also be used. For example, HSV (aka HSB) is 3-dimensional color space with the components of hue, saturation, and value (brightness). However, other color spaces, such as CIEL*a*b* may be used as well. Perceptually uniform color spaces are particularly advantageous in cases where color names are associated with prototypical locations in the color space and an algorithmic, geometrical method is used to determine the subvolumes or regions of the color space associated with each prototypical location.

Sometimes, it may be useful to use a multiplicity of color name dictionaries to cover the different types of vocabularies of users. In cases where multiple color dictionaries are used, each dictionary could be mapped independently onto color space regions or lexical mappings between the various dictionaries could be developed.

In addition to a dictionary of color terms, a color control or adjustment system would also use a dictionary of command or instruction language terms to convey color intents or color changes (differences) and the quantitative color differences to which they correspond. In addition to a lexicon of command terms, the command or instruction language would require using, interpreting, or creating a syntax for parsing such commands. Ideally, a created syntax would be relatively simple. A simple example of such a language might be created from three word phrases of the form <magnitude> <direction> <property> with the following syntax (the symbol ":" denotes "is defined as" and the symbol "|" denotes "or"):

<magnitude>: very-slightly|slightly|somewhat|moderately|significantly|strongly|very-strongly
<direction>: more|less
<property>: light|dark|colorful|saturated|contrasty|reddish|brownish|yellowish|greenish|bluish|purplish|pinkish|orangeish|grayish Phrases of this language are mapped to the control parameters of color modification transforms applied in a quantitative color space. Any color space could be used for these transforms, but color spaces that are perceptually uniform and with dimensions that relate closely to the perceptual attributes (lightness, chroma and hue) of the human visual system may make for a simpler, more intuitive mapping process.

The embodiments of the color control system disclosed herein would typically be implemented through software including a user interface that would provide users with a means to specify colors, color changes (differences), or color preferences using one or more natural languages.

Figure 4:
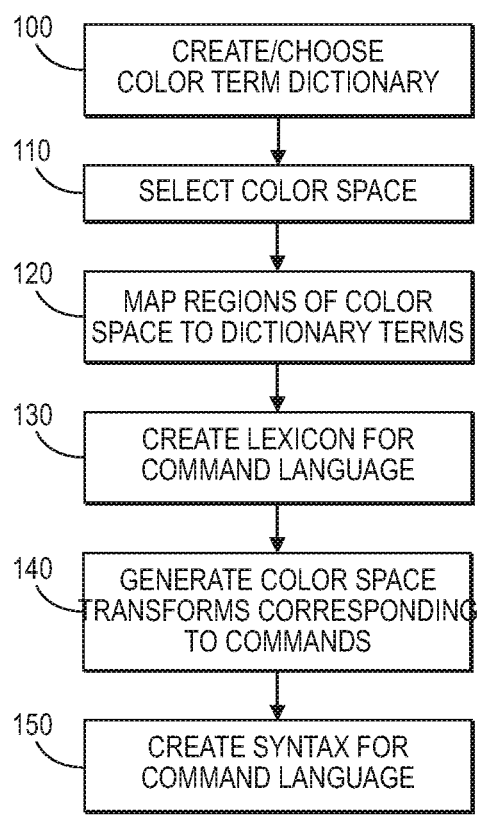
FIG. 4 is a flowchart detailing an exemplary method for correlating a working color space with a natural dictionary of color terms.

Turning to the figures, in embodiments, a usable natural language control system could be created as described in the flowchart of FIG. 4. The steps are listed in a particular order in the flowchart. However, this order should not be considered limiting, as the order of many of these steps may be changed without affecting the resulting color control system. First, a natural language color description dictionary of terms would be created and/or chosen from a set of pre-existing dictionaries 100. Then a color space in which the transformations will be performed is chosen 110. The regions of the color space are then mapped to terms in the color dictionary 120. A dictionary of command terms also needs to be created or selected 130. In embodiments, a library of basic transforms in the color space corresponding to various command terms would also be generated 140. There would be a general mapping between particular transform forms and command forms. The details of a user command would be used to tailor a transform once it was selected from the library as described in more detail with respect to FIG. 6. In addition to generating a lexicon of command terms, a syntax for using the command terms from the command dictionary in combination with the color terms of the color dictionary would be chosen as well 150. Both of the command and color term dictionaries may simply be part of one big dictionary.

Figure 5:
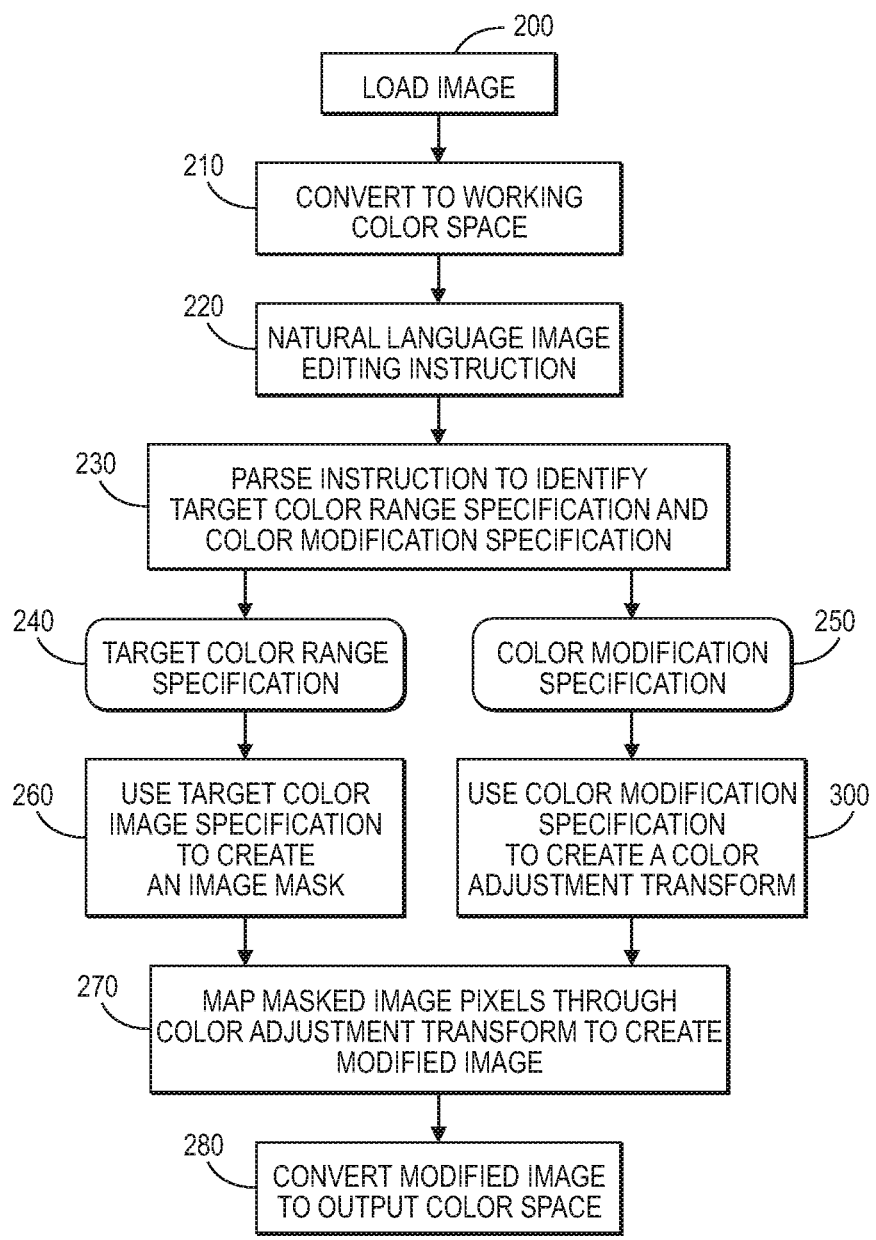
FIG. 5 is a flowchart detailing an exemplary embodiment of a natural language color modification method.

FIG. 5 illustrates a typical embodiment of a natural language color control and calibration system that a user would use to adjust an image or portion thereof. Again, the steps are listed in a particular order in the flowchart. However, this order should not be considered limiting, as the order of many of these steps may be changed without affecting the resulting color control system.

At step 200, the user would select a subject. The subject may be, for example, a scanned or created image or a set of input colors of a multi-dimensional lookup table. The subject may also be a portion of an image. For example, the user may be able to identify a quadrant of an image or a particular object in an image that the user would want to adjust. The natural language system included herein also encompasses the ability to mark areas of an image to be adjusted using a point and click system. At step 210, some or all of the selected subject would be mapped from the initial color space into the working color space of the color control system before or after the command is entered. The initial color space may be, for example, RGB on a display screen or CMYK on a printed document. For an image, for example, this may be a pixel-by-pixel mapping. However, many programs exist to reduce the time and processing power of such a mapping. For example, various algorithms use sampling techniques and/or allow a system to recognize uniform patches. The working color space could be any color encoding in which the color adjustment algorithms referenced in step 230 are conveniently applied. In general, perceptually uniform, device independent color encodings are preferred as working spaces.

The user also issues a verbal or written instruction to indicate the change required in the image at step 220. This command may be entered before or after the image or portion of the image is mapped into the working color space. The language used for this instruction could be the natural language of the user or it might be a language defined or limited by the application; e.g., the application may provide a user interface that could limit the language to a defined vocabulary or facilitate the parsing operation. An application-defined vocabulary may not allow 100% freedom of expression for the user, but could still be large enough to encompass most or all common language terms used with regard to color.

At step 230, the program would translate the entered verbal or written instruction into a color transform in the color working space. The program would contain a set of rules or instructions for parsing the instruction and implementing a transformation to the image corresponding to the user's command. The natural language command may be parsed to separate the command into components such as, for example, a target color range specification 240, and a color modification specification 250.

The target color range specification would include the color or colors to be modified. The target color range specification may also specifically identify colors that are not to be modified. The image adjustment would then be applied only to those colors that are included in the color range specified to be adjusted. In step 260, an image mask would be created from the specified color range 240 and the image in the working color space. The image adjustment will therefore be applied only to those colors that are included in the mask. In embodiments, a particular color might be present in an area of overlapping regions of specified color ranges and therefore might be contained within two or more overlapping ranges. If the user were to enter verbal commands involving both these regions then the program make an internal logic decision based upon a set of preprogrammed rules. For example, the commands may be followed consecutively with the last command entered given priority over earlier commands.

There are many methods, familiar to those of ordinary skill in the art, by which a mask can be created. One such method involves representing the specified color range as a subvolume of the working color space and then determining, for each pixel in the mapped image, if the color of the pixel is inside the specified color range subvolume. All such pixels inside the specified color range subvolume are in the mask while all pixels outside the specified color range subvolume are excluded from the mask. Another method of creating the image mask is to associate with each color in the color name dictionary or dictionaries one or more prototypical locations (points rather than subvolumes) in the working color space. For each image pixel the nearest prototypical color name location is determined and those pixels with nearest prototypical locations associated with color names in the specified color range are included in the mask. Pixels with a nearest prototypical location associated with color names not in the specified color range are excluded from the mask. While it is possible to map each individual pixel, algorithms exist to simplify such mappings. For example, various algorithms use sampling techniques and/or allow a system to recognize uniform patches.

Yet another alternative method to construct the mask is to construct a multidimensional lookup table, the input values of which sample the working color space. When the image pixel colors are mapped through this multi-dimensional lookup table the output values indicate whether the pixel are included in the mask or excluded from the mask. Such an embodiment might result in output values between 0 and 1 where a value of 0 represents exclusion from the mask and a value of 1 represents inclusion in the mask. Since multi-dimensional lookup tables generally use interpolation to determine output values the possibility of values between 0 and 1 exists. In such cases these fractional values could be retained, resulting in a fuzzy or blurred mask. In such a fuzzy or blurred mask pixels returning values between 0 and 1 would be considered to be partially included in the mask. Pixels that are partially in the mask would undergo a partial image adjustment. Alternatively, the output values might be rounded, or otherwise adjusted, to give only values of 0 or 1, thereby generating a binary mask.

Other methods for mapping such input terms into the working color space include, for example, use of Voronoi partitions, other tessellation methods, and k-D trees. A general example of such a method, suitable for both convex and non-convex regions, comprises tessellating each named region in the color space with tetrahedral simplices. Testing whether a given color lies inside any of the tetrahedra comprising the region will determine whether the color lies within the region. In the case of convex regions of the color space simpler tests not requiring tessellation of the region can be used.

In step 300, the natural language instruction is used to create a color adjustment transform. There are numerous methods by which such transforms could be constructed but in general all such methods will include the step of parsing the verbal color modification specification to determine 1) the magnitude of the desired modification, 2) the property that is to be modified and 3) the direction in which it is to be modified. These three pieces of information are a minimum requirement for any color adjustment transform. Additional information might be required to more fully specify the required transform before it can be constructed.

Figure 6:
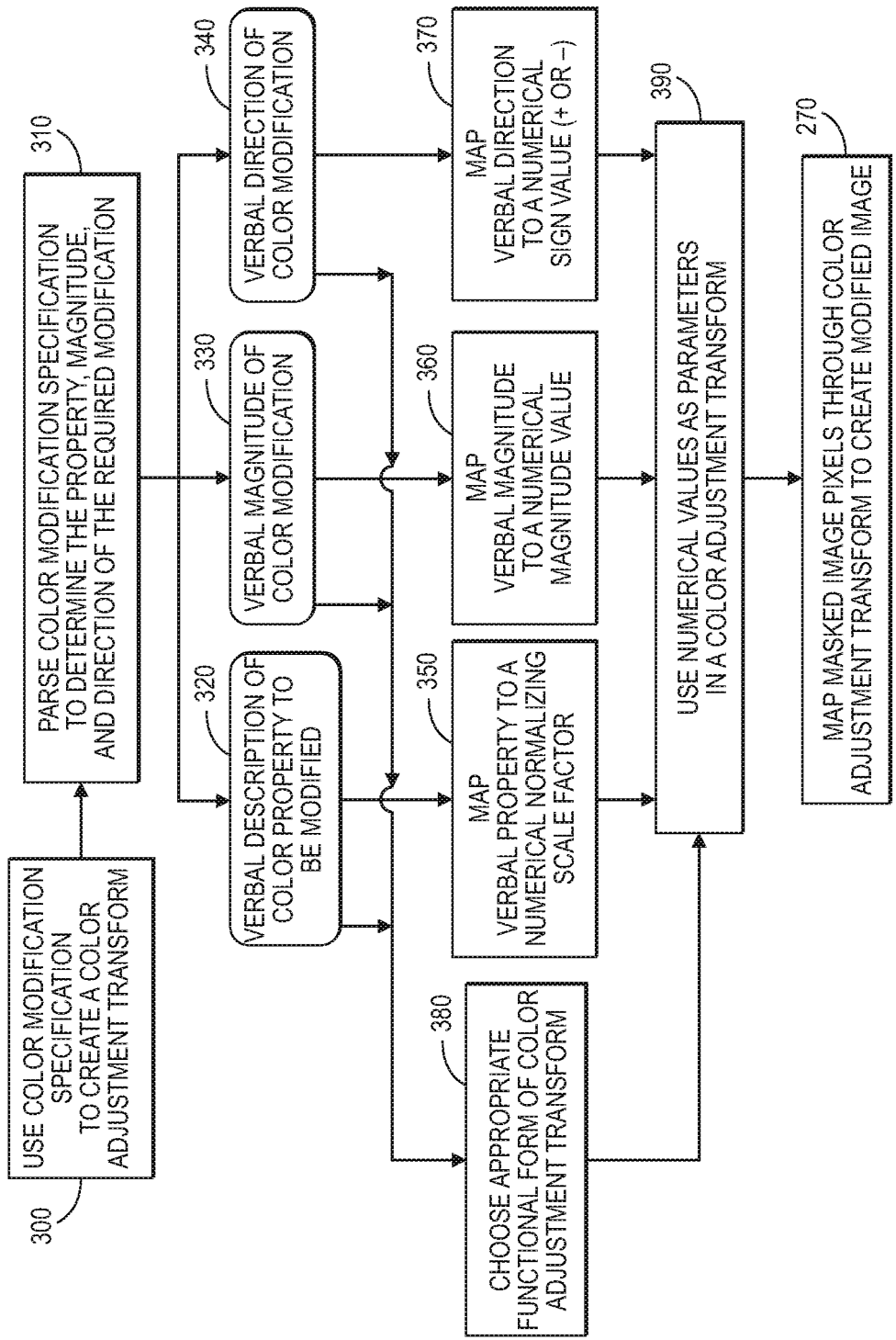
FIG. 6 is a flow chart detailing a general process for implementing a natural language command in a working color space.

Such additional information might be acquired from the pixels that are included in the mask. Such pixel-related information might include color values and spatial locations. The values of individual pixels or population statistics might be used in transform construction. What follows is a general example of transform construction, using an example command or instruction language such as, for example, those discussed herein. The steps involved in this general example of transform construction are illustrated in FIG. 6.

First, a verbal color modification specification is parsed 310 to obtain verbal specifications for the color property to be modified 320, the magnitude of the color modification 330, and the direction of the color modification 340. An example of parsing a natural language image editing instruction is illustrated in Table 2 below.

TABLE 2

| | |
|---|---|
| 220. Natural language image editing instruction | Make the red colors slightly less saturated. |
| 240. Target color range specification | The red colors |
| 250. Color modification specification | slightly less saturated |
| 320. Verbal description of color property to be modified | Saturation |
| 330. Verbal magnitude of color modification | Slight |
| 340. Verbal direction of color modification | Less |

The command, "Make the red colors slightly less saturated" is first parsed per into a target color range specification 240 (the red colors), and a color modification specification 250 (slightly less saturated), as noted earlier. Then, at step 300, the color modification specification is parsed into the color property to be modified 320 (saturation), the magnitude of the color modification 330 (slightly), and the direction of the color modification 340 (less). The verbal description of the color property to be modified is mapped to a numerical normalizing scale factor in step 350. This step allows for the magnitude specifications to be normalized such that the verbal descriptions of magnitude (330) correspond to equivalent or very similar perceptual changes in the target color regardless of the property that is being modified and regardless of the color being modified. For this example, the magnitude of color change requested is "slight" and this should lead to a perceptually similar "slight" change in the target "red" colors regardless of what perceptual property we are changing.

Perceptual properties can include, for example, saturation, lightness, darkness, colorfulness, chroma, hue, contrast, redness, greenness, yellowness, blueness, orange-ness, pinkness, brown-ness, purple-ness, and grayness. Additionally, one could modify any property that could be described as (color-name)-ness by moving the selected colors in a direction toward the prototypical location of (color-name). e.g., to increase the mauve-ness of a selection of colors move them toward the prototypical location of color name 'mauve'.

In step 360, the verbal magnitude of the color modification is mapped onto a numerical magnitude value. Generally, and in the interests of common sense, words that signify a larger magnitude would be mapped onto larger numerical magnitude values, but this is not a requirement. It is desirable however that the numerical magnitude scale, onto which magnitude words are mapped, corresponds linearly to the perceived magnitude that an average population, with normal color vision, associates with the verbal magnitude word or phrase.

Perceptual changes in a property will likely depend in part upon the color being modified and upon its initial scaled value in that property. For example, what constitutes a slight lessening of the saturation of reds in an image would likely be different if there was a low saturation of red in the image, then if there was a high saturation of red. In embodiments, the magnitude of a "slight" property change in the working color space would depend upon the context in which it was used.

Step 370 involves mapping the verbal direction to a numerical sign value (+ or −). This can be simply implemented by mapping the verbal direction to a multiplicative factor of +1 for verbal indications that increase a property and −1 for verbal indications that decrease a property.

The numerical values determined in steps 350, 360 and 370 are used as parameters in a color adjustment transform. This occurs in step 390. Generally a color adjustment transform will have some pre-determined functional form and the numerical values are applied to this functional form to control its specific effect on the colors. The choice of functional form of the color adjustment transform would be made in step 380. The choice might be arbitrarily made by the application designer or the functional form might be algorithmically determined by, for example, the values of the color property to be modified, the verbal magnitude of the color modification and the verbal direction of the color modification. The program implementing converting the natural language command into a transform in the color working space may have a library of basic forms to map to different sets of user instructions. Based upon the natural language command entered by the user, the program selects a functional form from this library. For example, one functional form might be chosen for lightness modifications and a different form chosen for chroma modifications. In this case, the functional form to which the numerical values determined in steps 350, 360 and 370 are applied, would depend on the type of color property to be modified.

As a trivial example of applying the numerical values to a functional form, consider the simple functional form of a linear mapping. Such a mapping will have two parameters—the slope of the line and an intercept. In this trivial example, the linear function would map the original value of the specified color property to a modified output value of that property. The slope of the line could be determined from the product of the values of the numerical normalizing scale factor, the numerical magnitude value and the numerical sign value. The intercept value of such a linear mapping would generally be zero, but might also be derived from the numerical magnitude value in special cases.

More complex functional forms will generally require more parameters to define them. The numerical values determined in steps 350, 360 and 370 would therefore be used to determine the values of the parameters. The numerical values may simply be assigned to the parameters, or parameters may be determined by some mathematical modification of combination of the numerical values.

Returning to FIG. 5, in step 270, a modified color image is created by applying the color modification transform and the image mask created in steps 380 and 260 respectively to the original image. Finally, the modified color image is then converted back to the original color space in step 280.

It is desirable if the transformation applied to the colors is both smooth and maintains color relationships. Smoothness is important to avoid contouring in images and color gradients. The maintenance of color relationships is important to avoid color gradient reversals.

Figure 7:
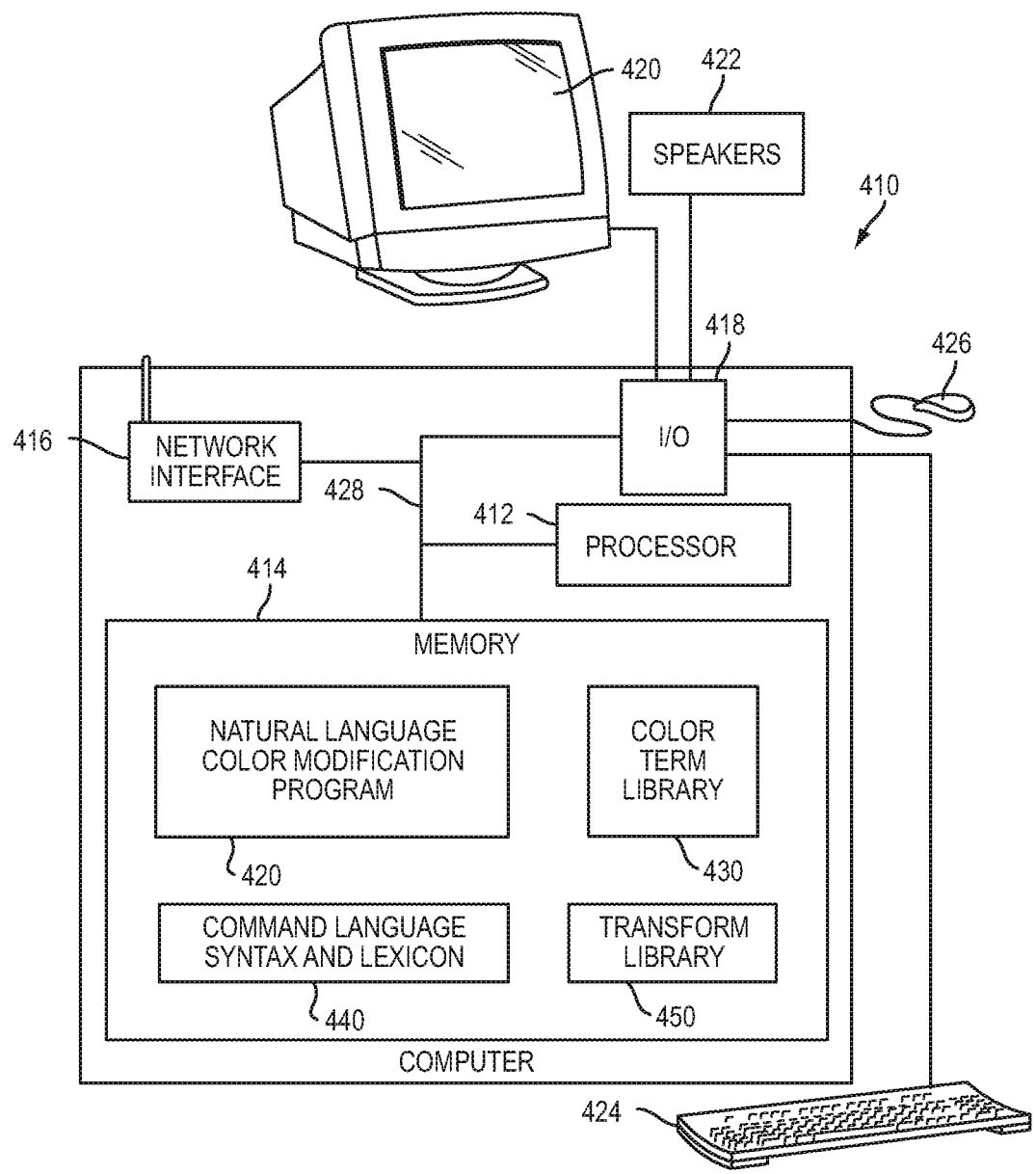
FIG. 7 is a functional block diagram of a computer system comprising the exemplary embodiment of a natural language color modification method according to FIGS. 5 and 6.

FIG. 7 shows a functional block diagram of an exemplary computer system 410 that may implement the methods of FIGS. 2 and 3. The illustrated computer system 410 includes a processor 412, which controls the overall operation of the computer system 410 by execution of processing instructions which may be stored in memory 414 connected to the processor 412. Computer system 410 also includes a network interface 416 and a user input output interface 418. The I/O interface 418 may communicate with one or more of a display 420, for displaying information to users, speakers 422, and a user input device, such as a keyboard 424 or touch or writable screen, for inputting text, and/or a cursor control device 426, such as mouse, trackball, or the like, for communicating user input information and command selections to the processor 412. The various components of the computer 10 may be all connected by a bus 428. The processor 412 executes instructions for performing the method outlined in FIG. 5 and/or FIG. 6. The computer system 410 may be, for example, a mainframe, desktop, laptop, or palmtop computer or a specialized device for modifying color.

Memory 414 holds the instructions for the natural language color modification system 420 described with respect to FIGS. 4-6. Memory 414 may also hold a natural language color term dictionary 430 containing ordinary language color terms that correspond to portions of a working color space, the command term lexicon and syntax 440, and a transform library 450.

The memory 414 may represent any type of computer readable medium, external or internal, such as random access memory (RAM), read only memory (ROM), magnetic disk or tape, optical disk, flash memory, or holographic memory. In embodiments, the memory 14 comprises a combination of these elements. For example, the natural language color term dictionary may be stored on a hard drive while the color modification process instructions may be stored in RAM on a chip. In some embodiments, the processor 12 and memory 14 may be combined in a single chip. The network interface 16 allows the computer to communicate with other devices via a computer network, such as a local area network (LAN) or wide area network (WAN), or the internet, and may comprise a modulator/demodulator (MODEM).

As will be appreciated, FIG. 7 is a high level functional block diagram of only a portion of the components which are incorporated into a computer system 410. Since the configuration and operation of programmable computers are well known, they will not be described further.

Figure 8:
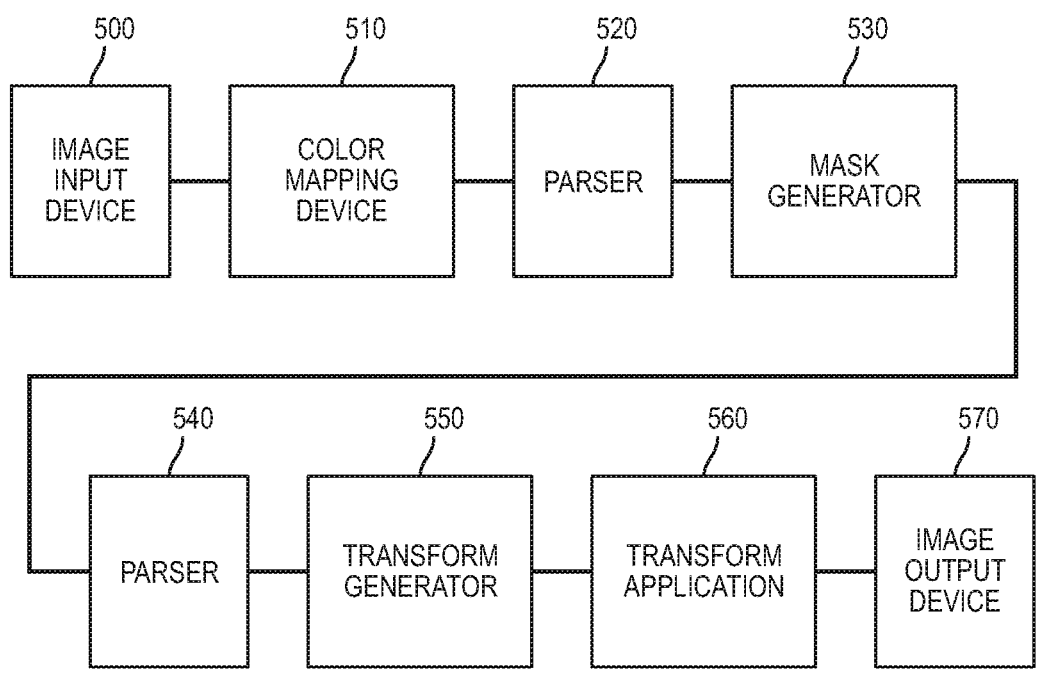
FIG. 8 schematically illustrates an exemplary embodiment of a natural language color modification system.

FIG. 8 schematically shows an exemplary apparatus for accomplishing the methods disclosed in FIGS. 5 and 6. It is important to note that many or all of these components may be part of the same device. All actions taken by the components described herein may be performed using a common processor or array of processors. A document or image input device 500 would be the source of data corresponding to a color image. The input device 500 could be, for example, a color scanner, a personal computer or workstation with appropriate document or image creation software, a camera or a data storage device, or internet linked electronic storage. The image data to be modified is selected by a user through a user interface. The image data is then sent to a color mapping device 510 where it is converted to a working color space—preferably, one that has separate luminance, chrominance, and hue components, although other color spaces can be used. The color mapping device 510 can take various forms and operational details, such as, for example, software running on a processor, or an ASIC. It may also be a component of the image input device 500. The apparatus also contains a parser 520 for parsing commands entered by a user. In embodiments, the parser 520 reduces a user command into a color (or colors) being modified and a modification to be made to that color. In embodiments, the system uses the color dictionary 430 to determine which colors are being affected by the user entered command. A mask generator 530 identifies the areas of the working color space corresponding to the user-entered color or colors to be modified. A parser 540 also separates a modification command into a characteristic to be modified, a magnitude, and a direction of modification. In embodiments, the command language and syntax is compared to pre-defined terms and structures in the command language lexicon and syntax 440. Parser 540 may be the same as parser 520 or it may be performed as a separate process. In embodiments, a transform generator 550 then selects the form of the transform from the transform library 450 in the working color space. The transform generator 550 creates the transform to be applied by modifying the transform by the user's command language. A transform applicator 560 applies the transform to the volumes in the color space corresponding to the colors to be modified. Finally, a modified image output unit 570 sends the image to an appropriate output device, e.g., a display screen, a printer, a facsimile machine, or electric paper.

The present invention as disclosed in embodiments herein may possibly be extended beyond color control systems and methods of controlling color. Modification and control of other image processing operations may also benefit from a natural language command interface. Such image processing operations might include sharpening, noise reduction, posterization and other special effects.

The color control system described herein is one application of a natural language command system. It is foreseen that the natural language color modification method disclosed herein may work for other properties as well as color and that the invention also encompasses modifications to documents based upon natural language commands beyond color control systems.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The embodiments described herein provide a number of unique advantages to users including the ability to find colors based on a natural language name or description, the ability to move a selection based on a qualitative natural language description, a flexible sorting and arrangement of selected colors along axes that make sense to the user, and the ability to select colors based on their appearance under different light sources.

All foregoing embodiments are specifically applicable to electrostatographic and/or xerographic machines and/or processes as well as to software programs stored on the electronic memory (computer usable data carrier within the memory) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
    receiving, by a computing device, initial user input comprising initial natural language commands identifying an initial color selection;
    displaying, by said computing device, a plurality of initial color samples corresponding to said initial color selection in a two-dimensional grid, wherein axes of said two-dimensional grid correspond to a predetermined standard axis;
    after said displaying of said initial color samples, receiving, by said computing device, at least one additional user input comprising at least one of additional natural language commands and a revised axis selection, wherein said additional natural language commands comprise a color change magnitude, a color change direction, and a color change property;
    revising, by said computing device, said initial color selection to a revised color selection based on said color change magnitude, said color change direction, and said color change property; and
    displaying, by said computing device, a plurality of revised color samples corresponding to said revised color selection in said two-dimensional grid, wherein axes of said two-dimensional grid correspond to said revised axis selection.

2. The computer-implemented method according to claim 1, wherein:
    said color change property comprises an indication of at least one of a color hue, a luminance, a saturation, and a colorfulness;
    said color change magnitude comprises an indication of how much of said color change property should be applied to said initial color selection; and
    said color change direction comprises an indication of whether said color change property should be increased or decreased in said initial color selection.

3. The computer-implemented method according to claim 1, wherein said initial natural language commands comprises a plurality of words maintained within at least one previously established library of natural language color names.

4. The computer-implemented method according to claim 1, wherein said additional natural language commands comprises a plurality of words maintained within at least one previously established library of natural language color modifiers.

5. The computer-implemented method according to claim 1, wherein said displaying of said initial color samples and said revised color samples comprise displaying a principal color sample corresponding respectively to said initial color selection and said revised color selection, and displaying secondary color samples having similarities to said principal color sample,
    wherein ones of said secondary color samples that are more similar to said principal color sample are positioned closer to said principal color sample, and
    wherein ones of said secondary color samples that are less similar to said principal color sample are positioned further from said principal color sample.

6. A computer-implemented method comprising:
    receiving, by a computing device, initial user input comprising initial natural language commands identifying an initial color selection;
    displaying, by said computing device, a plurality of initial color samples corresponding to said initial color selection in a two-dimensional grid, wherein axes of said two-dimensional grid correspond to a predetermined standard axis, and simultaneously displaying assigned names of said initial color samples adjacent to said initial color samples wherein said initial natural language commands are different than assigned names of said initial color samples;
    after said displaying of said initial color samples, receiving, by said computing device, at least one additional user input comprising at least one of additional natural language commands and a revised axis selection, wherein said additional natural language commands comprise a color change magnitude, a color change direction, and a color change property;
    revising, by said computing device, said initial color selection to a revised color selection based on said color change magnitude, said color change direction, and said color change property; and displaying, by said computing device, a plurality of revised color samples corresponding to said revised color selection in said two-dimensional grid, wherein axes of said two-dimensional grid correspond to said revised axis selection, and simultaneously displaying said assigned names of said revised color samples adjacent to said revised color samples, wherein said additional natural language commands are different than assigned names of said revised color samples.

7. The computer-implemented method according to claim 6, wherein:
said color change property comprises an indication of at least one of a color hue, a luminance, a saturation, and a colorfulness;
said color change magnitude comprises an indication of how much of said color change property should be applied to said initial color selection; and
said color change direction comprises an indication of whether said color change property should be increased or decreased in said initial color selection.

8. The computer-implemented method according to claim 6, wherein said initial natural language commands comprises a plurality of words maintained within at least one previously established library of natural language color names.

9. The computer-implemented method according to claim 6, wherein said additional natural language commands comprises a plurality of words maintained within at least one previously established library of natural language color modifiers.

10. The computer-implemented method according to claim 6, wherein said displaying of said initial color samples and said revised color samples comprise displaying a principal color sample corresponding respectively to said initial color selection and said revised color selection, and displaying secondary color samples having similarities to said principal color sample,
wherein ones of said secondary color samples that are more similar to said principal color sample are positioned closer to said principal color sample, and
wherein ones of said secondary color samples that are less similar to said principal color sample are positioned further from said principal color sample.

11. A computer-implemented method comprising:
receiving, by a computing device, initial user input comprising natural language commands identifying an initial color selection;
matching, by said computing device, said initial color selection to computer program colors used by an associated computer program to produce initial matching colors;
displaying, by said computing device, a plurality of initial color samples corresponding to said initial color selection in a two-dimensional grid, wherein axes of said two-dimensional grid correspond to a predetermined standard axis, and simultaneously displaying assigned names of said initial color samples adjacent to said initial color samples, wherein said initial natural language commands are different than assigned names of said initial color samples;
after said displaying of said initial color samples, receiving, by said computing device, at least one additional user input comprising at least one of additional natural language commands and a revised axis selection, wherein said additional natural language commands comprise a color change magnitude, a color change direction, and a color change property;
revising, by said computing device, said initial color selection to a revised color selection based on said color change magnitude, said color change direction, and said color change property;
matching said revised color selection to said computer program colors to produce revised matching colors;
displaying, by a computing device, a plurality of revised color samples corresponding to said revised color selection in said two-dimensional grid, wherein axes of said two-dimensional grid correspond to said revised axis selection, and simultaneously displaying said assigned names of said revised color samples adjacent to said revised color samples, wherein said additional natural language commands are different than assigned names of said revised color samples;
receiving, by said computing device, a selection of at least one of said revised color samples as at least one selected color from said user; and
providing, by said computing device, said at least one selected color to said associated computer program.

12. The computer-implemented method according to claim 11, wherein said matching of said initial user input to said computer program colors ignores said assigned names of said colors.

13. The computer-implemented method according to claim 11, wherein said matching of said initial color selection and said matching of said revised color selection comprise matching spectral color characteristic of said initial color selection and said revised color selection to said computer program color.

14. The computer-implemented method according to claim 11, wherein:
said color change property comprises an indication of at least one of a color, a luminance, a saturation, and a colorfulness;
said color change magnitude comprises an indication of how much of said color change property should be applied to said initial color selection; and
said color change direction comprises an indication of whether said color change property should be increased or decreased in said initial color selection.

* * * * *